US010491957B2

(12) United States Patent
Sposato et al.

(10) Patent No.: US 10,491,957 B2
(45) Date of Patent: *Nov. 26, 2019

(54) SYSTEM AND METHOD FOR PROVIDING INTERACTIVE ON-DEMAND CONTENT

(71) Applicant: AT&T INTELLECTUAL PROPERTY I, L.P., Atlanta, GA (US)

(72) Inventors: Stephen A. Sposato, Lafayette, CA (US); Orestis Manthoulis, Sausalito, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,323

(22) Filed: Jul. 10, 2017

(65) Prior Publication Data
US 2017/0311043 A1  Oct. 26, 2017

Related U.S. Application Data

(63) Continuation of application No. 14/745,597, filed on Jun. 22, 2015, now Pat. No. 9,736,543, which is a
(Continued)

(51) Int. Cl.
*H04N 7/10* (2006.01)
*H04N 7/025* (2006.01)
(Continued)

(52) U.S. Cl.
CPC ... *H04N 21/47815* (2013.01); *H04L 65/4023* (2013.01); *H04L 65/4084* (2013.01);
(Continued)

(58) Field of Classification Search
CPC ............... H04N 21/435; H04N 21/812; H04N 21/4722; H04N 21/8586; H04N 21/8133;
(Continued)

(56) References Cited

U.S. PATENT DOCUMENTS 6,240,555 B1 * 5/2001 Shoff ................. H04N 5/44543
348/E5.104
6,317,885 B1  11/2001 Fries et al.
(Continued)

OTHER PUBLICATIONS

"Verizon Takes FiOS TV Interactive", Lance Ulanoff, PC Magazine, Yahoo! News, Sep. 19, 2008.

*Primary Examiner* — Jason P Salce
(74) *Attorney, Agent, or Firm* — Guntin & Gust, PLC; Andrew Raymond (57) ABSTRACT

A set-top box device includes a network interface module and a client interface module. The network interface module is configured to receive interactive content instructions and an interactive content notification over an Internet protocol data connection, and to receive an associated on-demand content video stream from a television service provider. The network interface module is also configured to connect to a website containing product information for a product associated with the on-demand content video stream. The client interface module is configured to output the on-demand content video stream, to output the interactive content notification concurrently with the on-demand content video stream in response to outputting a portion of the on-demand content video stream and based on the interactive content instructions, and to output the website currently with the on-demand content video stream in response to a selection of the interactive content notification.

20 Claims, 5 Drawing Sheets

Related U.S. Application Data continuation of application No. 12/258,768, filed on Oct. 27, 2008, now Pat. No. 9,094,477.

(51) Int. Cl.
*H04N 21/478* (2011.01)
*H04N 7/173* (2011.01)
*H04N 21/472* (2011.01)
*H04N 21/4722* (2011.01)
*H04L 29/06* (2006.01)

(52) U.S. Cl.
CPC ..... *H04N 7/17318* (2013.01); *H04N 21/4722* (2013.01); *H04N 21/47202* (2013.01)

(58) Field of Classification Search
CPC ............. H04N 21/858; H04N 21/4316; H04N 21/4307; H04N 7/173178; H04N 21/482; H04N 21/47214; H04N 5/4453
See application file for complete search history.

(56) References Cited

U.S. PATENT DOCUMENTS

| | | | |
|---|---|---|---|
| 6,324,694 B1 | 11/2001 | Watts et al. | |
| 6,483,986 B1 * | 11/2002 | Krapf | H04N 5/44 348/E5.007 |
| 6,762,773 B2 | 7/2004 | Kolde et al. | |
| 6,792,617 B2 | 9/2004 | Gorbatov et al. | |
| 7,237,252 B2 * | 6/2007 | Billmaier | G06F 1/3203 348/E5.006 |
| 2002/0056129 A1 * | 5/2002 | Blackketter | H04N 5/44 725/112 |
| 2002/0066103 A1 * | 5/2002 | Gagnon | G06Q 30/06 725/60 |
| 2002/0100055 A1 | 7/2002 | Zeidman et al. | |
| 2002/0124252 A1 * | 9/2002 | Schaefer | H04N 7/17318 725/33 |
| 2002/0194604 A1 | 12/2002 | Sanchez et al. | |
| 2003/0177497 A1 * | 9/2003 | Macrae | G06Q 30/0241 725/60 |
| 2004/0268385 A1 * | 12/2004 | Gray | H04N 7/17318 725/34 |
| 2005/0005303 A1 | 1/2005 | Barone et al. | |
| 2005/0015811 A1 | 1/2005 | Norman et al. | |
| 2006/0174289 A1 | 8/2006 | Theberge et al. | |
| 2007/0022437 A1 | 1/2007 | Gerken et al. | |
| 2007/0130611 A1 | 6/2007 | Bradstreet et al. | |
| 2007/0157264 A1 | 7/2007 | Garfinkle et al. | |
| 2007/0180479 A1 | 8/2007 | Gravina et al. | |
| 2008/0002021 A1 | 1/2008 | Guo et al. | |
| 2008/0022300 A1 | 1/2008 | Angiolillo et al. | |
| 2008/0086742 A1 | 4/2008 | Aldrey et al. | |
| 2008/0092158 A1 | 4/2008 | Bhatnagar et al. | |
| 2008/0145034 A1 | 6/2008 | Barton et al. | |
| 2008/0201736 A1 | 8/2008 | Gordon et al. | |

* cited by examiner

SYSTEM AND METHOD FOR PROVIDING INTERACTIVE ON-DEMAND CONTENT

CROSS-REFERENCE TO RELATED APPLICATIONS

This application is a continuation of and claims priority to U.S. patent application Ser. No. 14/745,597, filed Jun. 22, 2015, which is a continuation of and claims priority to U.S. patent application Ser. No. 12/258,768, filed Oct. 27, 2008, now U.S. Pat. No. 9,094,477. The contents of the foregoing are hereby incorporated by reference into this application as if set forth herein in full.

FIELD OF THE DISCLOSURE

The present disclosure generally relates to communications networks, and more particularly relates to a system and method for providing interactive on-demand content.

BACKGROUND OF THE DISCLOSURE

Many television service providers supply their customers with a variety of on-demand content. The on-demand content can be television series, movies, sporting events, and the like. Depending upon the on-demand content, advertisements for different products or services can be included in the on-demand content. The advertisements can include such things as commercials during a television series program or product placements in a movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
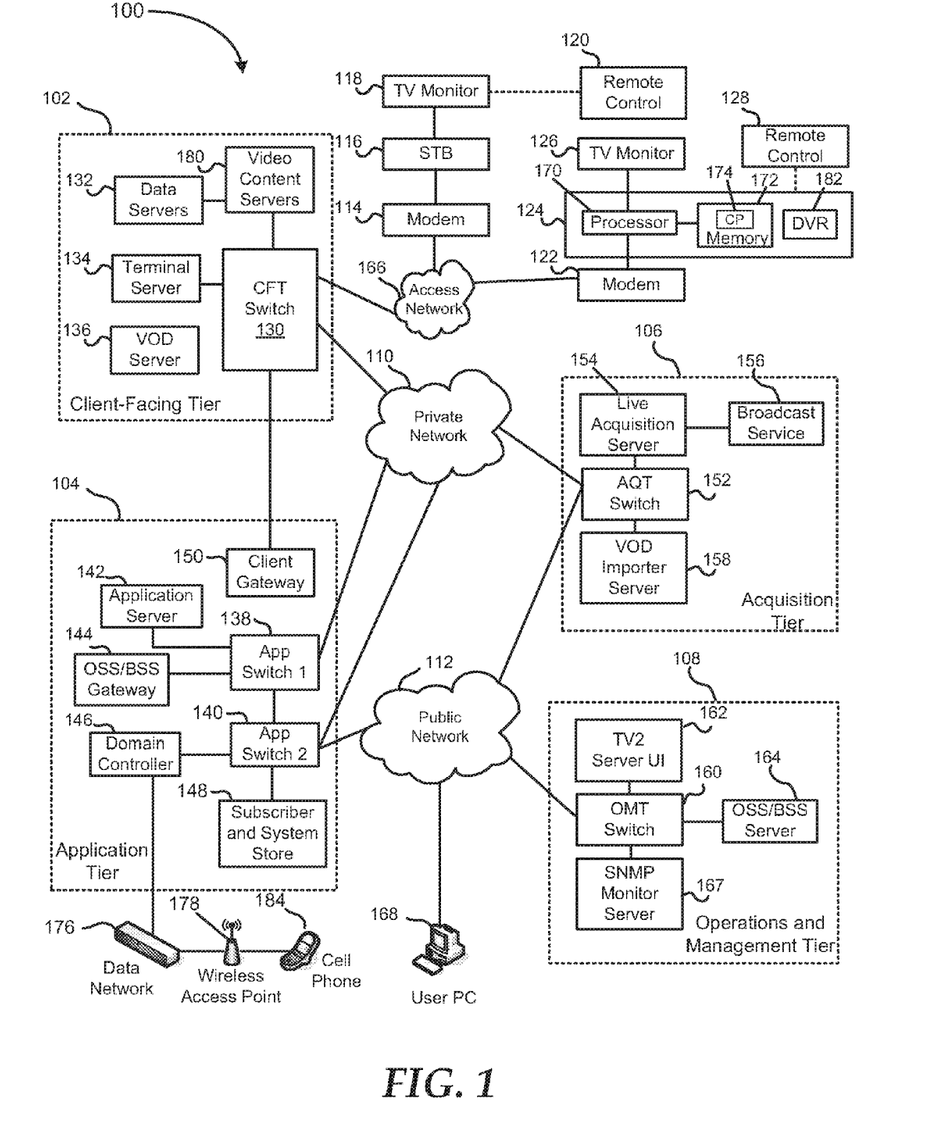
FIG. 1 is a block diagram illustrating an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the data servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The set-top box computer program 174 can contain instructions to receive many types of user preferences from the domain controller 146 via the access network 166. For example, the set-top box computer program 174 can include instructions to receive a request to record at least one television program at a video content storage module such as a digital video recorder (DVR) 182 within the second set-top box device 124. In this example embodiment, the set-top box computer program 174 can include instructions to transmit the request to the DVR 182, where the television program(s) are recorded. In an illustrative embodiment, the set-top box computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
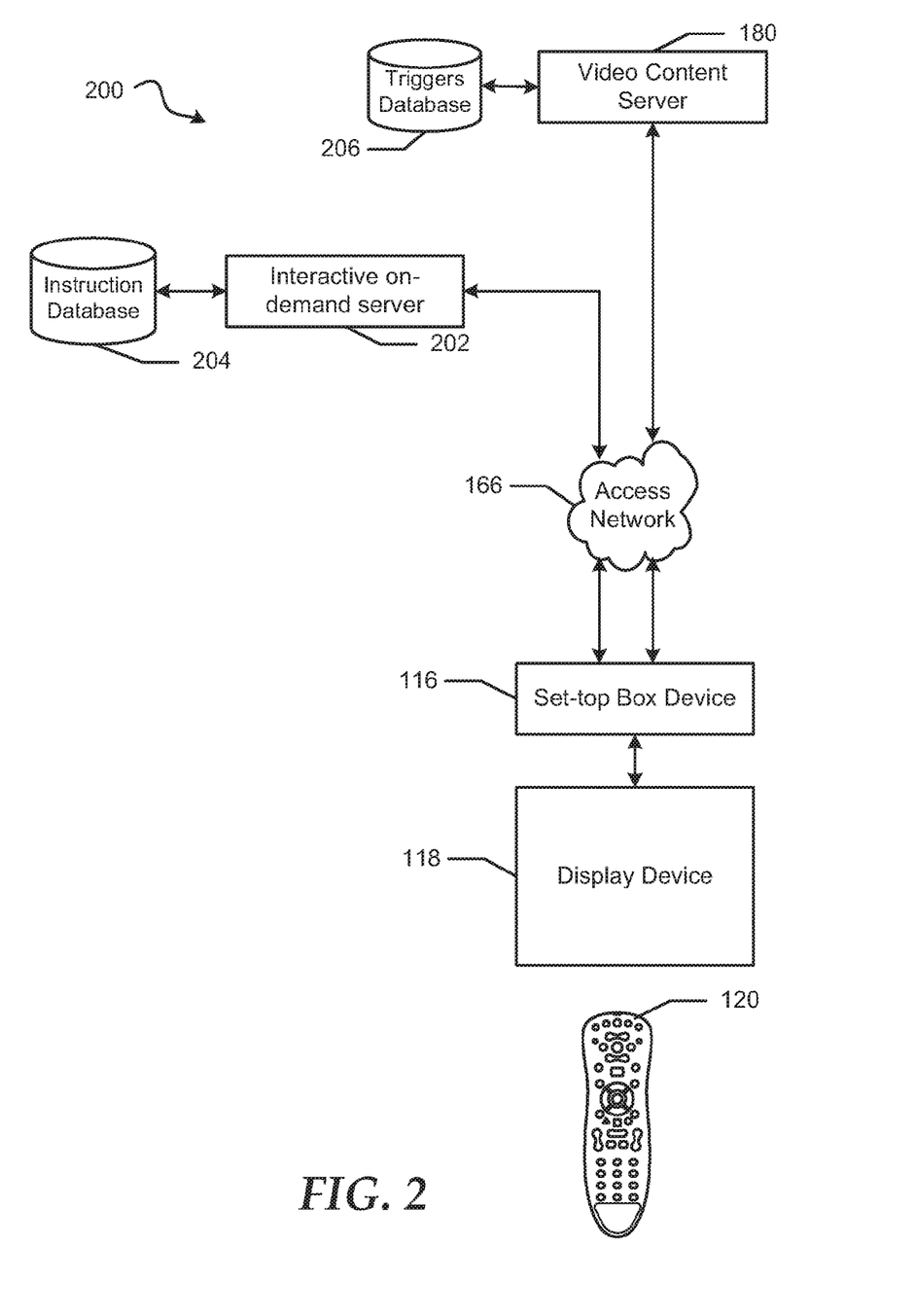
FIG. 2 is a block diagram of an interactive on-demand content system.

FIG. 2 shows a block diagram of an interactive on-demand content system 200 including an interactive on-demand server 202, an instruction database 204, and a triggers database 206. The instruction database 204 communicates with the interactive on-demand server 202, while the triggers database 206 communicates with one of the video content servers 180 shown in FIG. 1. The interactive on-demand server 202 and the video content server 180 are preferably in communication with the set-top box device 116 via the access network 166. In one embodiment, the interactive on-demand server 202 can communicate with the set-top box device 116 through an Internet protocol broadband data link of a very-high-bit-rate digital subscriber line (VDSL) connection of the access network 166, and the video content server 180 can send on-demand content video streams to the set-top box device 116 through the access network.

When a user selects on-demand content, the video content server 180 can notify the interactive on-demand server 202 that the user has selected the on-demand content. Based on the on-demand content selected by the user, the interactive on-demand server 202 can select interactive content instructions from the interactive content instruction database 204 to pre-load onto the set-top box device 116. The pre-loaded interactive content instructions can instructions be executable by a processor at the set-top box device 116 that can cause the set-top box device to provide at least one interactive content notification associated with specific on-demand content video stream from the video content server 180. The interactive content notification can inform the user that an interactive content feature is available, as discussed with respect to FIG. 3 below. Additionally, the interactive content instructions are preferably pre-loaded onto the set-top box device 116 so that any delay associated with providing the interactive content notification can be reduced because the interactive content instructions are already loaded on the set-top box device 116 and not needed to be received with the on-demand content video stream.

The television service provider can send the interactive content instructions and the resulting interactive content notification via the data link of the VDSL connection. The VDSL connection can allow faster data transfer rates than are available with video stream transmissions. The VDSL connection can also allow for improved performance of interactive content notification as compared to the video stream transmissions, such that the any delay in providing the interactive content notification is less with the pre-loaded interactive instructions via the VDSL connection. Additionally, the VDSL connection can allow two-way communication between the set-top box device 116 and the interactive on-demand server 202 for different interactive content features, discussed fully below.

The on-demand content can be video on-demand content, streaming content, store and forward content, three screen mobility content, and the like. In an embodiment, the video on-demand content and the store and forward content can be video streams that are associated with the on-demand content and provided to the user via the set-top box device 116. Even though the interactive on-demand content is described with respect to the set-top box device 116, it should be understood that the interactive on-demand content can also be provided to a personal computer, a cellular telephone, a gaming console, and the like. In an embodiment, the streaming video can be on-demand content provided to a personal computer via the access network 166. In another embodiment, the three screen mobility content can be on-demand content capable of being sent to the set-top box device 116, the personal computer, and the cellular telephone of the end user.

The video content server 180 can select interactive program triggers from the trigger database 206 that are associated with specific on-demand content. The interactive program triggers can be flags set in the on-demand content video streams to indicate to the set-top box device 116 that there is an interactive content instruction associated with the on-demand content video stream pre-loaded on the set-top box device. In one embodiment, an interactive program trigger can be a specific video frame of an Internet protocol video stream associated with the on-demand content in the video content server 180, such that when the set-top box device 116 outputs the specific video frame of the video stream, an interactive content notification is triggered in the set-top box device. Thus, the interactive program triggers can cause the set-top box device 116 to initiate the interactive content notification associated with the specific on-demand content via the pre-loaded interactive content instructions. The interactive program triggers can be sent at substantially the same time as the specific on-demand content video stream to the set-top box device 116 to provide the interactive content notification associated with the on-demand content as an output on the display device 118, and/or prior to the on-demand content video stream.

Upon providing the interactive content notification as an output on the display device 118, the set-top box device 116 can receive a user input via the remote control device 120, and can process the user input to determine whether to provide an interactive content feature. An interactive content feature can be a product information request, an offer to purchase the product, and the like. For example, a user can provide an input requesting product information regarding an advertised product, and the set-top box device 116 can display the requested product information based on information provided via the interactive program triggers or based on the pre-loaded interactive content instructions. The set-top box device 116 can then provide an interactive content display, discussed with respect to FIG. 3 below, allowing the user to request more detailed product information or to order the product based on information provided via the interactive program triggers or based on the pre-loaded interactive content instructions.

The set-top box device 116 can also provide the interactive content display to the display device 118 in response to additional data provided by the video content server 180 or by the interactive on-demand server 202. For example, the set-top box device 116 can send data indicating the user input to the interactive on-demand server 202, the video content server 180, and/or both. In response to receiving the data, the interactive on-demand server 202, or the video content server 180, can send additional data, such as additional interactive program triggers and/or additional product information, to the set-top box device 116. The set-top box device 116 can output the additional data received from the interactive on-demand server 202 or the video content server 180 to the display device 118.

Figure 3:
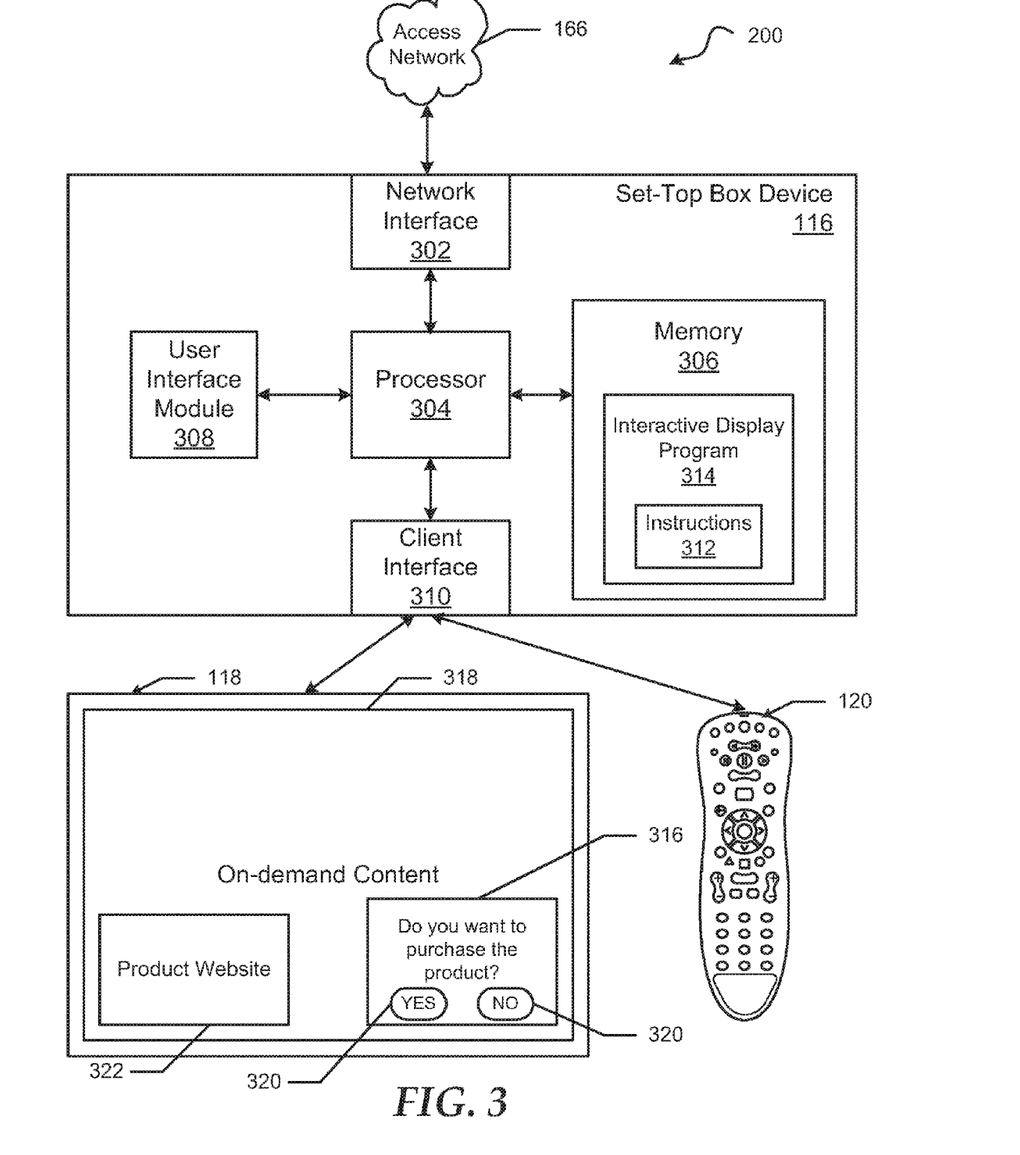
FIG. 3 is a block diagram of a portion of the interactive on-demand content system in greater detail.

FIG. 3 shows a portion of the interactive on-demand content system 200 including the set-top box device 116, the display device 118, the remote control device 120, and the access network 166. The set-top box device 116 includes a network interface module 302, a processor 304, a memory 306, a user interface module 308, and a client interface module 310. It should be understood that the modules can be implemented in hardware, software, and/or any combination of both hardware and software. The network interface module 302 is in communication with the access network 166 and with the processor 304. The processor 304 is in communication with the memory 306, and the processor can execute interactive content instructions 312 of an interactive display program 314 stored in the memory. The processor 304 is also in communication with the user interface module 308, and with the client interface module 310. The client interface module 310 is in communication with the display device 118 and with the remote control device 120.

The interactive on-demand server 202 of the television service provider can send the interactive content instructions 312 to network interface module 302 via the VDSL connection of the access network 166. The interactive content instructions 312 can be pre-loaded into the memory 306 of the set-top box device 116 in anticipation of the on-demand content video stream. That is, the interactive content instructions 312 can be stored in the memory 306 before on-demand content video stream associated with the interactive content instructions is received at the set-top box device 116 from the television service provider. Features of the interactive display program 314 can be stored at the set-top box device 116, such that the bandwidth required to transmit the interactive content instructions 312 to the set-top box device is decreased.

Based on the set-top box device 116 processing an interactive program trigger, the processor 304 can execute the interactive content instructions 312 included in the memory 306, and can provide an interactive content display 316 to the display device 118 via the client interface module 310. The interactive content display 316 can be presented as a picture-in-picture display within on-demand content 318, as a main display, and/or as the only display of the display device 118. Upon the interactive content display 316 being presented to the user, the on-demand content 318 can be continually displayed on the main display, can be displayed as the picture-in-picture display, can be paused, and/or the like. If the on-demand content 318 is paused, the on-demand content can be stored in the memory 306 for later access by the user. The interactive content display 316 can provide the user with the option to purchase a product, to learn more about a product, receive a reminder electronic mail message about a product, and the like. For example, if the on-demand content 318 is associated with a movie on-demand, the interactive content display 316 can output an offer to purchase a product shown in the movie on-demand Additionally, if the on-demand content 318 includes commercials, the interactive content display 316 can output an offer to purchase or learn more about the product in the commercial. The user can then select whether to purchase the product by selecting one of a plurality of selectable elements 320.

The selectable elements 320 can vary based on the interactive content notification output to the interactive content display 316. The user can select at least one selectable element 320 using the remote control device 120, such as by pressing a directional arrow key on the remote control device 120 until the desired selectable element is selected. Alternatively, the user can select the selectable element 320 by pressing a number key on a keypad of the remote control device 120.

The set-top box device 116 can receive the user input from the remote control device 120 and can process the user input via the user interface module 308. In response to the user input, the processor 304 can modify the interactive content display 316 to provide additional selectable elements 320. In another example, the processor 304 can modify the interactive content display 316 to provide feedback to the user regarding a selected element. The set-top box device 116 can also provide data related to the user selection to the interactive on-demand server 202 and/or to the video content server 180 via the access network 166. In response to the user selection, the interactive on-demand server 202 can provide data to the set-top box device 116 related to the user selection. The data provided by the interactive on-demand server 202 can include an Internet protocol connection with a manufacturer's website for the product displayed, so that the user can purchase the product via the interactive content display 316. Additionally, the interactive on-demand server 202 can send information about the product to the set-top box device 116 for display on the interactive content display 316.

Alternatively, upon the user selecting the selectable element 320, the network interface module 302 can send selection to the interactive on-demand server 202 via the access network 166, the network interface module 302 can then connect to a website containing product information about the product associated with the on-demand connect video stream. The client interface module 310 can output the product website as a picture-in-picture display 322. The user can use the picture-in-picture display 322 to show the user's navigation through the website. If wants to purchase the product on the website, the user can use the remote control device 120 to send a purchase request to the client interface module 310. The network interface module 302 can then send the purchase request to the website. Upon completion of the interactive content, the on-demand content 316 can be displayed over the full screen of the display device 118, can be re-output to the display device (if paused), and the like.

In an embodiment, the on-demand content may be an on-demand game in which the user may compete via the on-demand content display 318. The set-top box device 116 can keep track of the user's score and send the score to the interactive on-demand server 202. The interactive on-demand server 202 can compare the user's score to the scores of other users playing the game to rank the user's game play against the other users. These results can be displayed to the user via the interactive content display 316. In another embodiment, the interactive on-demand server 202 can send an additional trigger signal to the set-top box device 116. The additional trigger signal can initiate execution of additional interactive content instructions from the interactive content instructions 312 in the memory 306. Execution of the additional interactive content instructions 312 by the processor 304 can cause the interactive content display 316 to be changed, or an additional interactive content display to be presented.

Figure 4:
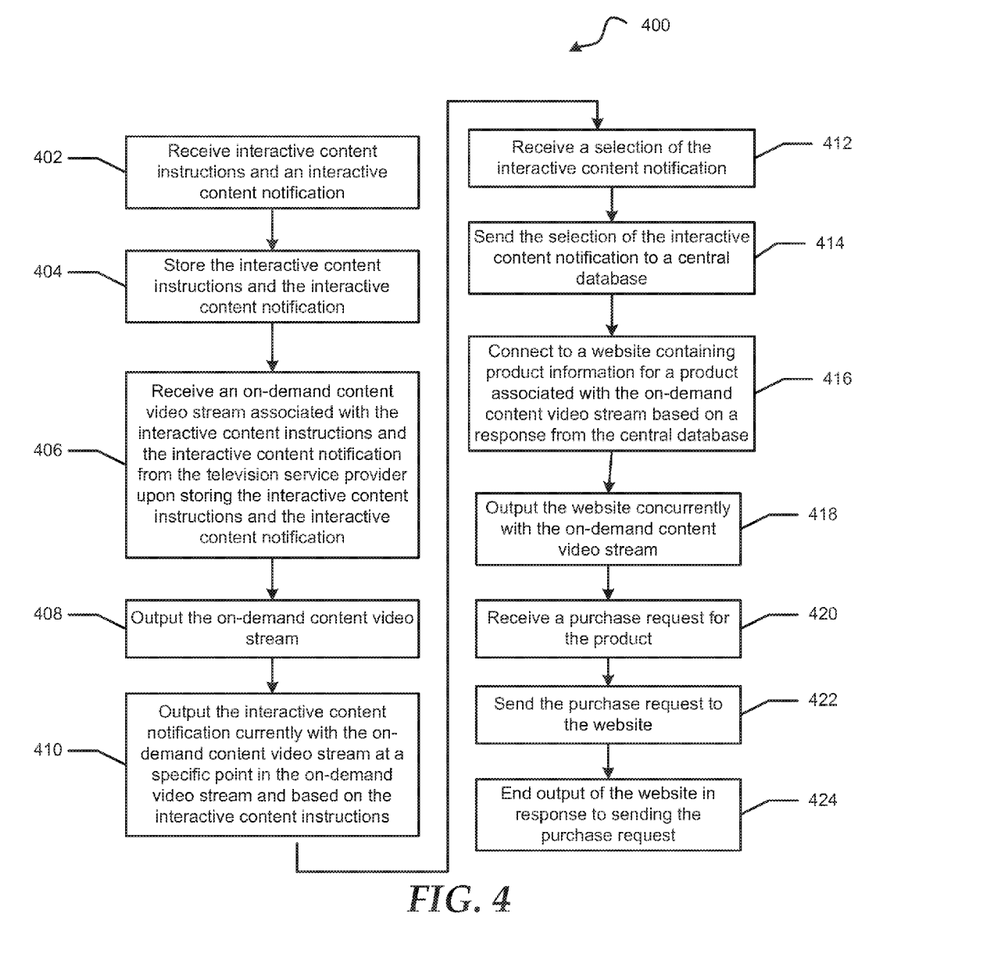
FIG. 4 is a flow diagram of a method for providing interactive on-demand content.

FIG. 4 shows a flow diagram of a method 400 for providing interactive on demand content. At block 402, interactive content instructions and an interactive content notification is received over an Internet protocol data connection from a television service provider. The interactive content instructions and the interactive content notification are stored at block 404. At block 406, an on-demand content video stream associated with the interactive content instructions and the interactive content notification is received from the television service provider upon storing the interactive content instructions and the interactive content notification. At block 408, the on-demand content video stream is output. At block 410, the interactive content notification is output to a display currently with the on-demand content video stream at a specific point in the video stream and based on the interactive content instructions.

A selection of the interactive content notification is received at block 412. At block 414, the selection of the interactive content is sent to a central database over the Internet protocol data connection. The central database can be the interactive on-demand server, the video content server, and the like. A website containing product information for a product associated with the on-demand content video stream is connected to, based on a response from the central database at block 416. The website is output concurrently with the on-demand content video stream at block 418. At block 420, a purchase request for the product is received. The purchase request is sent to the website at block 422. At block 424, the output of the website is ended in response to sending the purchase request.

Figure 5:
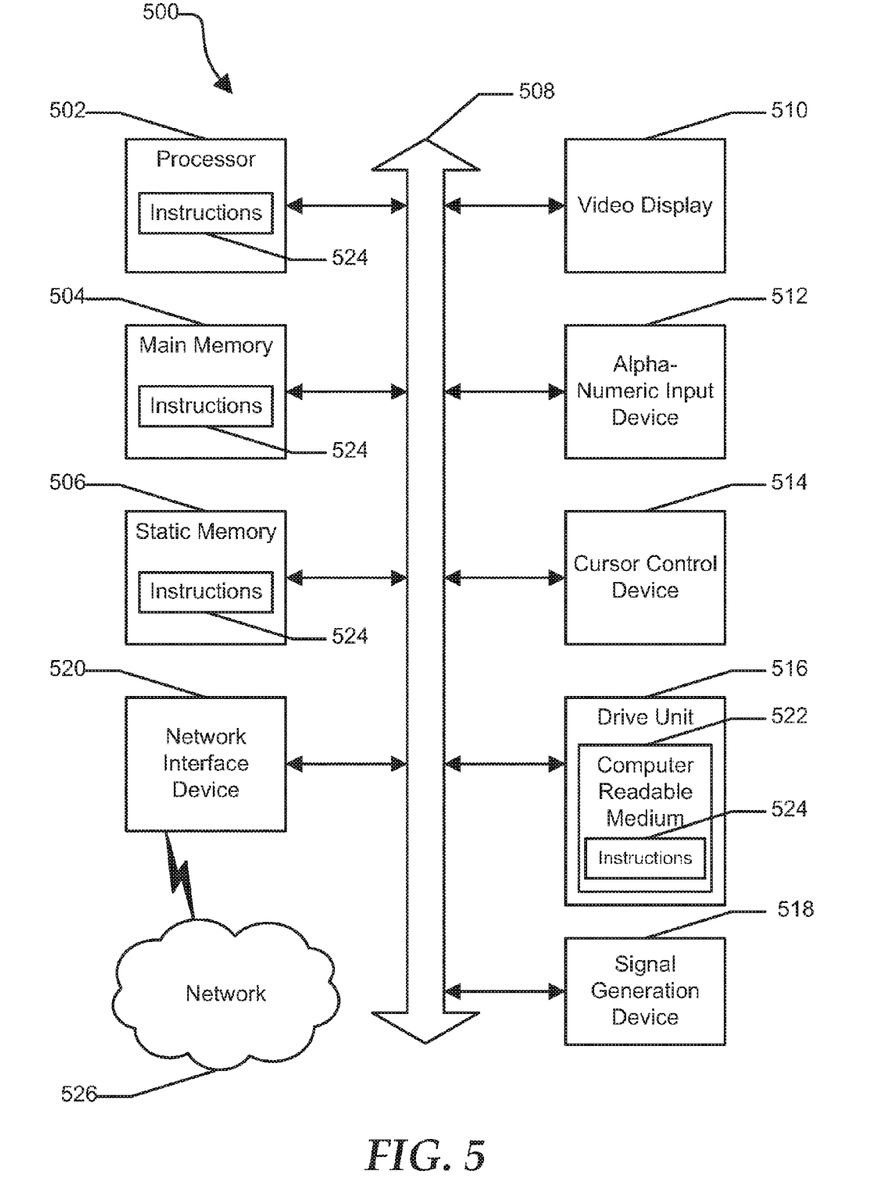
FIG. 5 is a block diagram of a general computer system.

FIG. 5 shows an illustrative embodiment of a general computer system 500 in accordance with at least one embodiment of the present disclosure. The computer system 500 can include a set of instructions that can be executed to cause the computer system to perform any one or more of the methods or computer based functions disclosed herein. The computer system 500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. The network interface device 520 can provide connectivity to a network 526, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:

receiving, by a processing system including a processor, interactive content instructions and an interactive content notification via a very-high-bit-rate digital subscriber line (VDSL) connection of a network, wherein a selection of the interactive content instructions from an instructions database is based on a user selection of on-demand video content, and wherein the receiving of the interactive content instructions is responsive to the user selection of the on-demand video content;

storing, by the processing system, the interactive content instructions and the interactive content notification at a memory of the processing system;

receiving, by the processing system after the storing, an on-demand content video stream with a trigger via a connection of the network that has a slower data transfer rate than the VDSL connection, wherein the trigger comprises marking a particular video frame of the on-demand content video stream which, when the particular video frame is outputted by the processing system to a display, causes a presentation of the interactive content notification at the display;

outputting, by the processing system, the on-demand content video stream to the display;

outputting, by the processing system, the interactive content notification upon detecting the trigger in the particular video frame of the on-demand content video stream being outputted to the display, wherein the interactive content notification is outputted according to the interactive content instructions, wherein the interactive content notification includes a description of interactive content, wherein the on-demand video content includes a commercial presenting an advertisement for a product, and wherein the interactive content notification is associated with the advertisement;

receiving, by the processing system, a selection of an option included in the interactive content notification being presented at the display;

responsive to the selection of the option, connecting, by the processing system, to a website providing interactive content associated with the on-demand content video stream; and outputting, by the processing system, the interactive content associated with the website concurrently with the on-demand content video stream to the display.

2. The method of claim 1, wherein the interactive content instructions and the interactive content notification are received over an Internet protocol data connection from a television service provider, and wherein additional triggers are provided based on user input received at the processing system.

3. The method of claim 1, wherein the interactive content instructions are received from an interactive on-demand server.

4. The method of claim 1, wherein the interactive content notification is received from a video content server.

5. The method of claim 1, wherein the on-demand content video stream is received from an on-demand server.

6. The method of claim 1, wherein the on-demand content video stream is associated with the interactive content instructions and the interactive content notification from a television service provider.

7. The method of claim 1 wherein the on-demand content video stream is selected from one of a video on demand video stream, a streaming Internet protocol video stream, a store and forward video stream, a three screen mobility video stream, or any combination thereof, and wherein the outputting the interactive content associated with the website comprises outputting user navigation of the website.

8. The method of claim 1, further comprising:
receiving, by the processing system, a purchase request for the product; and
sending, by the processing system, the purchase request to the website.

9. The method of claim 8, further comprising ending, by the processing system, an output of the website in response to sending the purchase request.

10. The method of claim 8, wherein the interactive content notification and the website are output from a set top box as a picture-in-picture display.

11. The method of claim 1, further comprising:
outputting, by the processing system, a selectable option to receive a message reminder associated with the interactive content.

12. The method of claim 11, wherein the storing reduces delay by avoiding receipt of the interactive content instructions to initiate an interactive session.

13. A server, comprising:
a processing system including a processor; and
a memory that stores executable instructions that, when executed by the processing system, facilitate performance of operations, comprising:
receiving a selection of on-demand content from a media processor; and
responsive to reception of the selection of the on-demand content, transmitting interactive content instructions and an interactive content notification to the media processor via a network, wherein a selection of the interactive content instructions from an instructions database is based on the selection of the on-demand content, wherein an on-demand content video stream is output from the media processor to a display, wherein the interactive content notification is output from the media processor to the display upon detection of a trigger during outputting of the on-demand content video stream at the display, wherein interactive content associated with the on-demand content is output by the media processor to the display, and wherein the trigger comprises marking a particular video frame of the on-demand content video stream which, when the particular video frame is outputted to the display, causes a presentation of the interactive content notification, wherein the on-demand content includes a commercial presenting an advertisement for a product, and wherein the interactive content notification is associated with the advertisement, wherein the transmitting the interactive content instructions and the interactive content notification is via a very-high-bit-rate digital subscriber line (VDSL) connection of the network, wherein the on-demand content video stream is via a connection of the network that has a slower data transfer rate than the VDSL connection, wherein the media processor connects to a website providing the interactive content responsive to reception of a selection of the interactive content notification, and wherein the media processor outputs a selectable option to receive a message reminder associated with the interactive content.

14. The server of claim 13, wherein the interactive content notification and the website are output as a picture-in-picture display.

15. The server of claim 13, wherein the interactive content notification includes a description of interactive content, wherein the interactive content associated with the on-demand content is output by the media processor concurrently with the on-demand content video stream, and wherein additional triggers are provided based on user input received at the media processor.

16. The server of claim 13, wherein the interactive content comprises user navigation of a website, and wherein the on-demand content is selected from one of a video on demand video stream, a streaming Internet protocol video stream, a store and forward video stream, a three screen mobility video stream, or any combination thereof.

17. A non-transitory machine-readable storage medium, comprising executable instructions that, when executed by a processing system including a processor, facilitate performance of operations, comprising:
receiving a selection of on-demand content from a media processor; and
responsive to reception of the selection of the on-demand content, transmitting interactive content instructions and an interactive content notification to the media processor via a network, wherein a selection of the interactive content instructions from an instructions database is based on the selection of the on-demand content, wherein an on-demand content video stream is output by the media processor to a display, wherein the interactive content notification is output by the media processor to the display upon detection of a trigger during outputting of the on-demand content video stream when a particular video frame of the on-demand content video stream is outputted to the display, and wherein additional triggers are provided based on user input received at the media processor, wherein the on-demand content includes a commercial presenting an advertisement for a product, and wherein the interactive content notification is associated with the advertisement, wherein the transmitting the interactive content instructions and the interactive content notification is via a very-high-bit-rate digital subscriber line (VDSL) connection of the network, wherein the on-demand content video stream is via a connection of the network that has a slower data transfer rate than the VDSL connection, wherein interactive content associated with the on-demand content is output by the media processor and wherein the output of the on-demand content video stream by the media processor is paused responsive to the output of the interactive content by the media processor.

18. The non-transitory machine-readable storage medium of claim 17, wherein the interactive content notification and the website are output as a picture-in-picture display.

19. The non-transitory machine-readable storage medium of claim 17, wherein interactive content associated with the on-demand content is output by the media processor concurrently with the on-demand content video stream, wherein the trigger comprises marking the particular video frame of the on-demand content video stream which, when the particular video frame is outputted, causes a presentation of the interactive content notification and wherein the interactive content comprises user navigation of a website.

20. The non-transitory machine-readable storage medium of claim 17, wherein the interactive content notification includes a description of interactive content, wherein the interactive content notification is output by the media processor as a picture-in-picture display, and wherein a selectable option is output by the media processor to receive a message reminder associated with interactive content associated with the on-demand content.

* * * * *